Aug. 15, 1961     R. A. GORDON ET AL     2,995,979
NEGATIVE CARRIER FOR 135 AND 828 SIZE NEGATIVES IN STRIP FORM
Filed June 12, 1959                         2 Sheets-Sheet 2
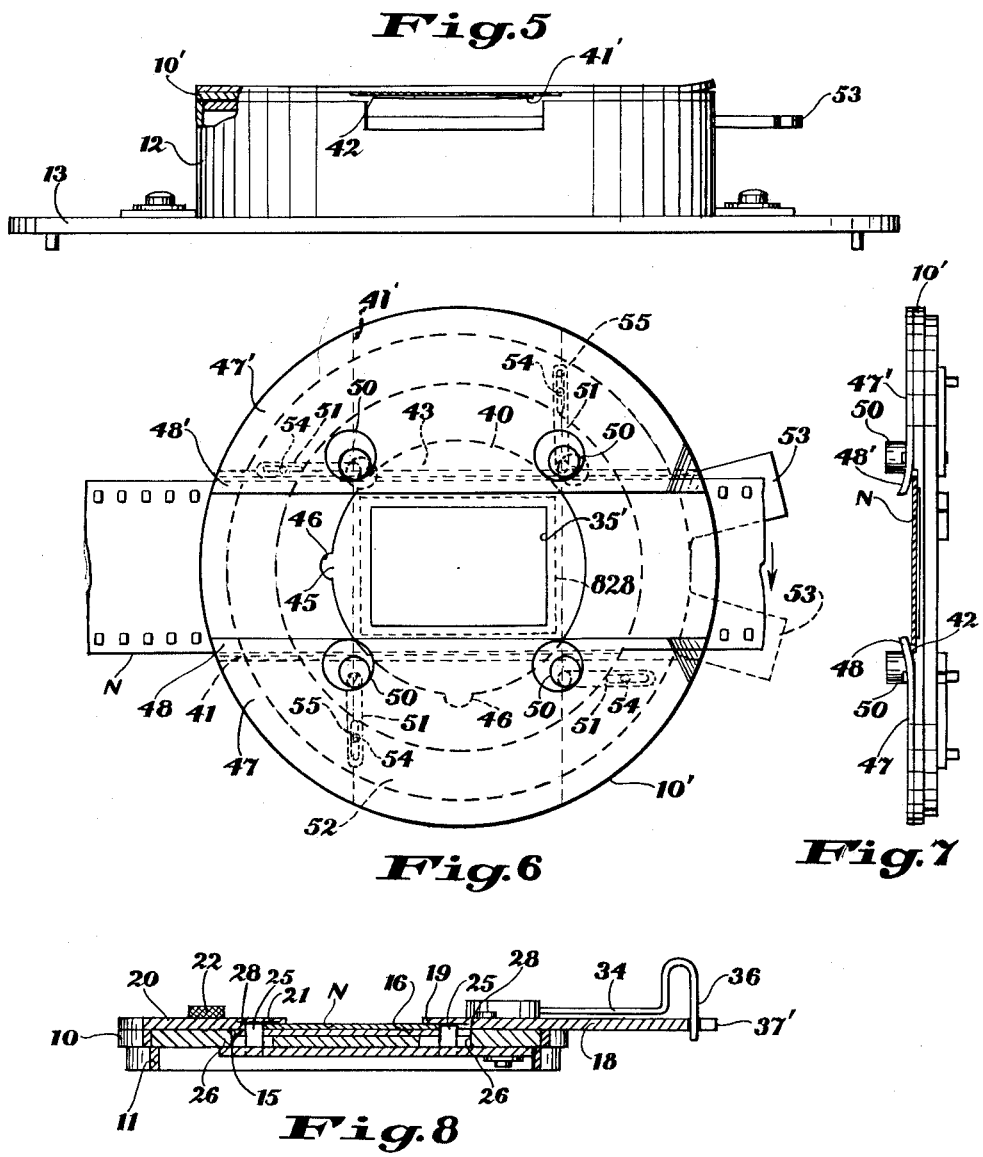
Robert A. Gordon
James E. Harvey
INVENTORS

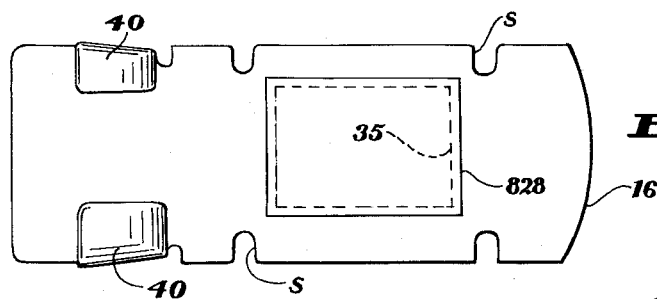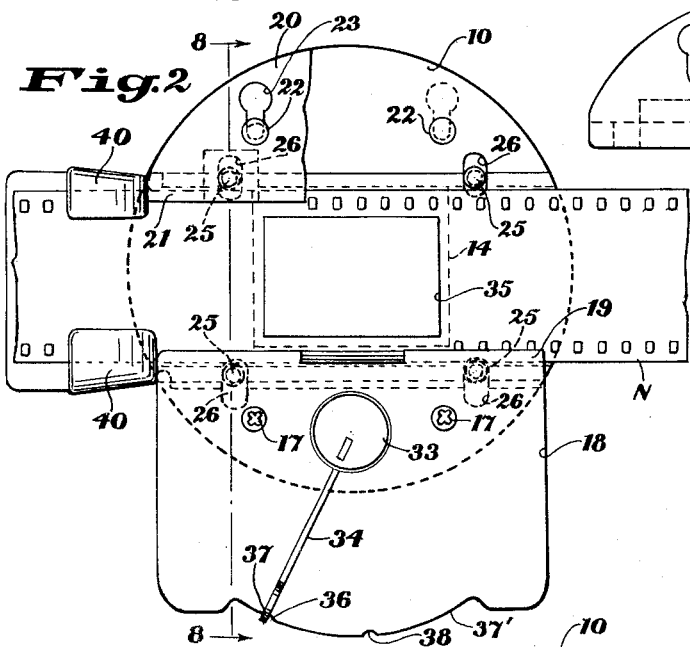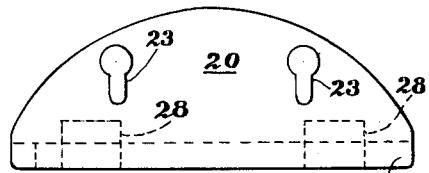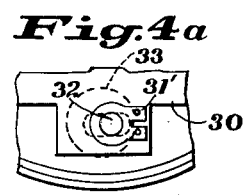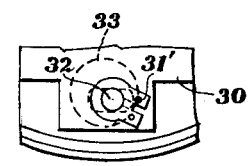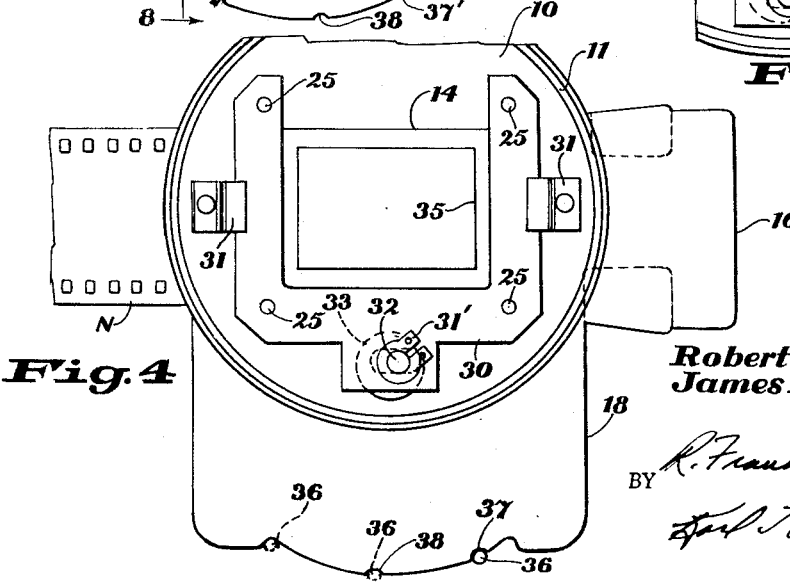

United States Patent Office 2,995,979
Patented Aug. 15, 1961

2,995,979
NEGATIVE CARRIER FOR 135 AND 828 SIZE NEGATIVES IN STRIP FORM
Robert A. Gordon and James E. Harvey, Rochester, N.Y., assignors to Eastman Kodak Company, Rochester, N.Y., a corporation of New Jersey
Filed June 12, 1959, Ser. No. 819,933
5 Claims. (Cl. 88—24)

The present invention relates to photographic enlarging printers, and particularly to a negative strip holder or carrier which is an accessory for commercially available printers to enable photofinishers to make enlarged prints from either 828 or 135 negatives in strip form.

In conventional photographic enlarging printers provisions are made for making different size enlarged prints from different size negatives. This usually involves providing a separate negative carrier for each size negative which is to be printed and which negative carriers can be interchangeably positioned on the negative carrier stage of the printer to position the negative in the printing beam in proper spaced relation with the projector lens to produce the desired print magnification on the printing paper positioned at the focal plane of the projection lens. For the most part the negative carriers used on high speed projection printers are adapted to accommodate individual or cut negatives rather than negatives in strip form. It is, however, well known to provide negative carriers or holders for negatives in strip form where the negative is centered longitudinally of the aperture in the carrier by feeding the strip manually back and forth in the carrier. Here again, however, a separate negative carrier is provided for each negative size and no provision is made for adjusting a negative laterally of the printing aperture in the carrier to accommodate for "head cropping." By "head cropping" as used throughout this specification is meant a condition where a person's head or other point of interest in the negative appears at one extreme lateral edge of the negative so that in order to get it into the print it is necessary to adjust the negative laterally of the printing aperture in the carrier to include all of the negative area adjacent this edge into the aperture in the negative carrier.

The primary object of the present invention is to provide a negative strip holder kit which will enable photofinishers to make enlarged prints from either 828 or 135 size negatives in strip form on a conventional projection printing apparatus.

Another object is to provide a negative strip carrier or holder of the type described which will permit centering either negative size in the gate for printing.

And a further object is to provide a negative strip carrier of the type described which will permit automatic lateral centering of either size negative with respect to an aperture corresponding to its size without having to visually judge such centering.

And another object is to provide a negative strip carrier of the type described which will permit full top edge exposure of the picture from either size negative when minimum "head cropping" is required.

The novel features that we consider characteristic of our invention are set forth with particularity in the appended claims. The invention itself, however, both as to its organization and its methods of operation, together with additional objects and advantages thereof will best be understood from the following description of specific embodiments when read in connection with the accompanying drawings in which:

FIG. 1 is a plan view of one of two like aperture plates forming a part of our negative strip holder when constructed in accordance with a preferred embodiment of the present invention. The two aperture plates are alike except for the size of the printing apertures therein, the larger one, for 828 size negatives, being shown here in full lines and the smaller one, for 135 size negatives, being shown in dotted lines;

FIG. 2 is a top plan view of the assembled holder with the 135 size aperture plate in place along with a 135 negative strip, and showing a part of the removable film channel plate broken away;

FIG. 3 is a plan view of the removable film channel plate separate from the holder;

FIG. 4 is a bottom elevational view of the assembled holder shown in FIG. 3, and showing the manner in which the film centering pins are adjustably mounted, and showing the eccentric for adjusting them for centering 135 negatives;

FIG. 4a is a detail view of the pin adjusting eccentric in the position it assumes for centering 828 size negative strips;

FIG. 4b is a detail view corresponding to FIG. 4a but showing the pin adjusting eccentric in the position it might assume for reduced "head cropping" of either size negative;

FIG. 5 is a side elevational view of an adapter which might be used to position our negative strip holder on the negative stage of any conventional projector printing apparatus, and showing another embodiment of negative strip holder seated thereon;

FIG. 6 is a top plan view of the embodiment of negative strip holder shown in FIG. 5;

FIG. 7 is a side elevational view of the negative strip holder shown in FIG. 6 and looking into the film channel with a film strip in place therein; and FIG. 8 is a sectional view taken substantially on line 8—8 of FIG. 2.

In order to understand the purpose and function of the present negative strip holder it is necessary to know that 828 and 135 amateur roll films have the same over-all width and that the negative size of an 828 film is 28 x 40 mm. whereas the negative size of a 135 film is 24 x 36 mm.

Essentially, the present negative strip holder comprises a support provided with a film channel through which a strip of either 828 or 135 negatives may be longitudinally moved with respect to an 828 or 135 printing aperture while being held flat over such apertures. The negative strips are guided laterally of their respective printing apertures by guides which engage the opposite longitudinal edges of the negative strips. These guides are adjustably mounted so that by swinging a lever to one extreme position a 135 negative is properly laterally centered with respect to its printing aperture, and by swinging the lever to a second or intermediate position a 828 negative is laterally centered with respect to its printing aperture and by adjusting the lever beyond the second or intermediate position either size negative is adjusted laterally of its respective printing aperture to obtain full top edge exposure of the picture where minimum "head cropping" is required.

Referring now to FIGS. 1–4b and 8, a negative strip holder constructed in accordance with a preferred embodiment of the present invention comprises a circular supporting plate 10 which is adapted to be interchangeably positioned at the negative stage of a conventional projector printer or enlarger in place of the negative carrier usually used with such printers or enlargers. While this can be accomplished in many different ways, I have shown the bottom of the plate 10 provided with a flange 11 of smaller radius than the plate proper, and which can seat within a sleeve 12 carried by an adapter plate 13 designed to fit into the negative carrier stage of a printer or enlarger in place of the ordinary interchangeable negative carriers supplied for use with such apparatus, see FIG. 5. I have shown the adapter 13 provided with a sleeve 12 of some length, because ordinarily when making 3½" x 2½" or 3½" x 5" prints from either 828 or 135 negatives it is necessary to change the spacing between the negative plane and the projector lens to obtain full coverage of these print areas when using these negative sizes on conventional printers or enlargers. For cases where this difference in negative to projector lens spacing is not required, the plate 13 could merely be provided with a circular opening into which the supporting plate 10 and its flange 11 would seat in the same manner as it does on sleeve 12 as shown. It should be pointed out however that the form and shape of the adapter plate 13 is not essential to the present invention except that it must be of a shape such as to removably seat a negative carrier constructed in accordance with the present invention at the negative stage of a conventional projection printer.

The center of the supporting plate 10 is provided with a rectangular opening 14 which is slightly larger in dimensions than the larger, or 828, negative to be printed. The top surface of the plate is provided with a shallow groove 15 running diametrically thereacross and embracing the opening 14. One or the other of two aperture plates 16 are adapted to be interchangeably seated in this groove 15 as shown in FIGS. 2 and 8 to define the negative plane when printing. The two aperture plates 16 will be exactly alike except that one will have a small printing aperture 35 corresponding to 135 size negatives, whereas the other will have a printing aperture 828 corresponding to an 828 size negative. The thickness of the aperture plates 16 are equal to the depth of groove 15 so that when the aperture plate is situated in the supporting plate the top surface of the aperture plate will be flush with the top of the supporting plate and the negative plane. Also, when the aperture plates are mounted in the supporting plate 10 their printing apertures will be centered with respect to the opening 14 in the supporting plate by virtue of the sides of groove 15 engaging the longitudinal edges of the plates and laterally extending slots S in the longitudinal edges of the plates engaging negative shifting pins as will be described below.

Fixed to the top of the supporting plate 10 at one side of the groove 15 by screws 17 is a film channel plate 18 which has a lip 19 which overhangs the groove 15 and an aperture plate 16 seated therein to form with the top surface of the aperture plate a channel through which a negative strip N is longitudinally fed and held flat over the printing aperture 35 or 828 in the aperture plate. The other side of the negative strip N is likewise confined by a removable film channel 20 which is detachably connected to the top of supporting plate 10 and has a lip 21 overhanging the other edge of the negative strip N. This second film channel is detachably connected to supporting plate 10 to allow the aperture plates 16 for 828 and 135 negatives to be interchangeably seated in the groove 15. To this end clamping thumb screws 22 are threaded into the top of support plate 10 and will pass through the enlarged portions of the slots 23 in the film channel plate but will clamp the channel plate in place when it is slipped laterally to position the screws in the narrow portion of the slots 23.

The negative strip N is guided laterally of the printing apertures 35 or 828 in the aperture plate 16 by means of four pins 25 which extend upwardly through elongated slots 26 in the supporting plate, said slots extending laterally of the film path. These pins extend above the negative plane and are so spaced from one another that opposite pairs of these pins engage opposite longitudinal edges of either an 828 or a 135 negative strip N positioned in the holder. These pins are also engaged by the slots S in the sides of the aperture plates 16 to center their respective printing apertures longitudinally with respect to the opening 14. The underside of the film channel plates 18 and 20 are milled out; as indicated at 28, to accommodate the ends of these pins and allow them to be adjusted laterally of the printing apertures for centering of the different size negatives with respect to the printing apertures in their corresponding aperture plate 16.

Each of these pins 25 is fastened to the arms of a U-shaped yoke member 30 which embraces the opening 14 and is slidably confined to the bottom of supporting plate 10 by spring clips 31 so as to be free to move laterally of the negative strip path. Adjustment of this yoke member and pins 25 thereon is effected by means of an eccentric 32 on knob 33 and which knob and eccentric are held in assembled position by a grip ring 31'. The knob 33 and eccentric 32 thereon are rotated by means of a lever 34 the end of which is bowed to form a spring finger 36 which resiliently engages an arcuate edge 37' of the film channel plate 18 and form a grip by means of which the lever may be swung over an arcuate path. This spring finger 36 cooperates with one of two notches 37 or 38 in the edge 37' to produce a detent action indicating when the pins 25 are properly adjusted to center a 135 or an 828 negative with respect to the printing aperture in its corresponding aperture plate 16.

In use, the first step is to place the aperture plate 16 in the carrier which has a printing aperture corresponding to the size of negative to be printed. The negative strip holder is then loaded by feeding a negative strip N from left to right, looking at FIG. 2, through funnel shaped guides 40 turned up from the opposite edges of the aperture plates 16 which guide the leading edge of the film between the two film channel plates 18 and 20 and the aperture plate 16. Negative centering from left to right is done manually by moving the negative strip to the left or right. Front to back centering of the negative strip relative to its printing aperture is accomplished by swinging lever 34 which rotates eccentric 32 which in turn shifts the yoke member 30 and the pins 25 thereon laterally of the film path. If a 135 size negative is being printed then with the finger 36 of lever 34 located in detent or notch 37 the pins 25 will be in proper position to center the negative strip relative to the 135 printing aperture, see FIG. 4. On the other hand, if an 828 size negative is being printed then the lever 34 is swung until its finger 36 snaps into notch 38 and the pins 25 are properly adjusted to center an 828 negative with regard to the printing aperture 828 in its aperture plate 16. This position of adjustment of the eccentric 32 is indicated in FIG. 4a. "Head cropping" of any negative 828 or 135, may be reduced by moving lever 34 farther to the right, or beyond notch 38 thereby moving the negative towards the front (lower edge of FIG. 2) of the holder for increased exposure of the top edge of the negative. The extreme position of eccentric 32 for "head cropping" is shown in FIG. 4b.

In FIGS. 5, 6 and 7 there is shown another modification of negative strip holder which accomplishes the same purpose as the one described above. The primary difference is found in the structure used for shifting the negative strip laterally to center the different size negatives relative to their respective printing apertures and to correct for "head cropping."

Here as before the negative strip holder comprises a circular supporting plate 10' having a circular opening 40 extending therethrough whose diameter is slightly larger than the diagonal of an 828 size negative. To permit the negatives to be printed either horizontally or vertically, the top surface of the supporting plate is provided with two grooves 41 and 41', at right angles to one another, which run diametrically across the plate. The center portion of these grooves are undercut slightly as shown at 42 in FIG. 7, so that the film strip is guided only at its edges and the printed area is not subject to scratching as the film strip is fed therethrough.

In this instance the aperture plates are two like circular plates 43, one having a printing aperture 35' corresponding to the size of a 135 negative as shown in FIG. 6 and the other an 828 printing aperture. These aperture plates have stepped grooves corresponding to grooves 41 and 41' in the top surface of the supporting plate and can be removably seated in a circular recess in the top of the supporting plate 10' so that the stepped grooves thereon line up with those in the supporting plate and the surface of the printing aperture therein is flush with the undercut portion of grooves 41 and 41'. The printing plates 43 can be oriented in their seat with their printing aperture in either a horizontal or vertical position by locating a semicircular lug 45 extending from the periphery thereof in either of two corresponding semicircular recess 46 in the edge of the circular seat in the aperture plate 10' and spaced 90° with respect to one another.

Detachably fixed to the top of the supporting plate 10' at each side of the grooves 41 and 41' therein are film channel members 47 and 47' each having a lip portion 48 and 48' which overhangs the edges of grooves 41 and 41' to confine the film edges and hold the film flat over the printing aperture. The film channel members are symmetrical so that they may be fixed to the top of supporting plate 10' in proper aligned relation with either the horizontal or vertical grooves 41 and 41' in the top of the latter. The overhanging lips 48 or 48' may be turned up slightly at one end as shown in FIGS. 5 and 7, to provide a funnel to facilitate threading of a negative strip into the holder.

Rotatably mounted in the supporting plate 10' are four eccentric pins 50 which are disposed at the four corners of a square defined by the intersecting corners of the two grooves 41 and 41' in the supporting plate 10'. The four pins are so spaced that in any position of adjustment they will engage and guide the longitudinal edges of the negative strip no matter whether it is supported horizontally or vertically in the holder. Four pivot arms 51 are riveted at one end to the bottom of the eccentric pins and are moved through a 90° arc by rotating a ring 52 through an arm 53 which extends radially from the supporting plate. The ring 52 is rotatably mounted in a circular recess in the bottom of the supporting plate 10' by the use of spring clips, not shown, and has four pins 54 fixed thereto which engage elongated slots 55 in pivot arms 51. When the lever 53 is moved anticlockwise, as indicated by the dotted lines, the eccentric pins move through an arc of 90° moving the film sideways by the amount of the offset in the eccentric. By virtue of the drive linkage provided for these pins, this lateral shifting of the film relative to the printing apertures takes place regardless of the front to back (vertical) or side to side (horizontal) threading of the film through the holder.

It will thus be seen that within the range of adjustment of lever 53 the pins can be adjusted to properly center either a 135 size negative or an 828 size negative with its respective printing aperture as well as providing for further lateral film shift to correct for "head cropping" in any negative.

From the above description it will be understood that we have provided a single negative gate or holder for use with a conventional projection printer and which, in addition to accommodating both 135 and 828 size negatives in strip form, will provide for lateral shift of the negatives relative to their printing apertures to correct for "head cropping." So far as we are aware there is no negative gate or holder available which will accommodate two sizes of negatives in strip form and also allow correction for "head cropping" in either size of negative.

While we have shown and described certain specific embodiments of our invention, we are aware that many modifications thereof are possible. Our invention, therefore, is not to be limited to the precise details of construction shown and described but is intended to cover all modifications coming within the scope of the appended claims.

Having thus described our invention, what we claim as new and desire to secure by Letters Patent of the United States is:

1. A negative strip holder for selectively and adjustably positioning 135 and 828 size photographic negative strips at the negative stage of a photographic enlarging apparatus and comprising in combination, a supporting plate having an opening larger than the 828 size negative and adapted to be seated on the negative stage of the enlarging apparatus with said opening therein situated to pass the enlarger printing beam; an aperture plate provided with a printing aperture for 135 size negatives; means for supporting said aperture plate on said supporting plate with the printing aperture therein aligned with the opening in said supporting plate; a second aperture plate provided with a printing aperture for 828 size negatives; means for supporting said second aperture plate on said supporting plate with the printing aperture therein aligned with the opening in said supporting plate; means on said supporting plate for guiding the movement of a negative strip longitudinally across the printing aperture in the aperture plate positioned thereon and confining the upper surface of the strip adjacent its longitudinal edges to hold it flat in a plane as it passes over the printing aperture; said means including edge guides adapted to engage both longitudinal edges of a negative strip positioned over the aperture plate and interconnected and movably mounted on said support to conjointly shift the engaged film strip laterally to center both the 135 and 828 size negatives relative to their corresponding aperture plate and laterally shift any one negative on a strip relative to its corresponding aperture plate to reduce 'head cropping."

2. A negative strip holder according to claim 1 including a manually adjustable member for conjointly shifting said edge guides in the same direction laterally of the path of movement of the negative strips, and indexing means associated with said adjustable member for indicating when said edge guides are positioned to center the different size negatives relative to their corresponding aperture plate.

3. A negative strip holder for selectively and adjustably positioning 135 and 828 size photographic negative strips at the negative stage of a photographic enlarging apparatus and comprising in combination; a supporting plate having an opening larger than the 828 size negative and adapted to be seated on the negative stage of an enlarging apparatus with said opening therein situated to pass the enlarger printing beam; an aperture plate provided with a printing aperture for a 135 negative; means for supporting said aperture plate on said supporting plate with the printing aperture therein aligned with the opening in said supporting plate; a second aperture plate provided with a printing aperture for an 828 negative; means for supporting said second aperture plate on said supporting plate with the printing aperture therein aligned with the opening in said supporting plate; means on said supporting plate for guiding the movement of a negative strip longitudinally across the printing aperture in the aperture plate position thereon and adjusting the negative strip laterally of said printing aperture while confining the upper surface of the strip adjacent its longitudinal edges to hold it flat in a plane as it passes over the printing aperture; said last mentioned means including a yoke member slidably mounted on the underside of said supporting plate to move laterally of the aperture plate; four pins fixed to said yoke member in a rectangular relationship and extending through transverse slots in said supporting plate and across the plane in which the negative strip is situated for printing purposes, said pins spaced apart such that one pair engages one longitudinal edge of the negative strip and the other pair engages the other edge of said strip; an eccentric for adjusting said yoke member and the pins thereon to shift the negative strips laterally; a control lever for rotating said eccentric; and detent means cooperating with said control lever to indicate when said pins are properly adjusted to center both the 828 and 135 size negatives with their respective aperture plates.

4. A negative strip holder for selectively and adjustably positioning 135 and 828 size photographic negative strips at the negative stage of a photographic enlarging apparatus and comprising in combination; a supporting plate having an opening larger than the 828 size negative and adapted to be seated on the negative stage of an enlarging apparatus with said opening therein situated to pass the enlarger printing beam; an aperture plate provided with a printing aperture for a 135 negative; means for supporting said aperture plate on said supporting plate with the printing aperture therein aligned with the opening in said supporting plate; a second aperture plate provided with a printing aperture for an 828 negative; means for supporting said second aperture plate on said supporting plate with the printing aperture therein aligned with the opening in said supporting plate; means on said supporting plate for guiding the movement of a negative strip longitudinally across the printing aperture in the aperture plate position thereon and adjusting the negative strip laterally of said printing aperture while confining the upper surface of the strip adjacent its longitudinal edges to hold it flat in a plane as it passes over the printing aperture; said last mentioned means including four eccentric pins disposed in a rectangular relationship about said printing apertures and spaced apart by a distance such that opposite pairs of pins will engage the opposite longitudinal edges of the negative strip; each of said eccentric pins eccentrically mounted on a rotatable pin; a drive link fixed to the bottom of each pin and extending transversely thereof; a drive ring rotatably mounted on said supporting plate in surrounding relation with the opening therein; four drive pins spaced around said ring and each engaging an elongated slot in a different one of said drive links whereby oscillation of said ring will cause each of said eccentric pins to oscillate by the same amount in the same direction to shift a negative strip laterally of its printing aperture while confining it at both edges.

5. A negative strip holder according to claim 4 in which said eccentric pins are mounted at the four corners of a square whose dimensions are such that the negative strip can be passed between them in either of two directions at right angles to one another and be shifted laterally by the same eccentric pin adjusting mechanism.

References Cited in the file of this patent

UNITED STATES PATENTS

| 2,260,672 | Johanson | Oct. 28, 1941 |
| 2,907,258 | Roth | Oct. 6, 1959 |

FOREIGN PATENTS

| 537,406 | Germany | Nov. 2, 1931 |
| 523,556 | Great Britain | July 17, 1940 |